United States Patent
Ichikawa et al.

(10) Patent No.: US 10,370,139 B2
(45) Date of Patent: Aug. 6, 2019

(54) PLASTIC CONTAINER HAVING PEARL-LIKE APPEARANCE AND PROCESS FOR PRODUCING THE SAME

(71) Applicant: TOYO SEIKAN KAISHA, LTD., Tokyo (JP)

(72) Inventors: Kentarou Ichikawa, Yokohama (JP); Nobuhisa Koiso, Yokohama (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 229 days.

(21) Appl. No.: 15/222,634

(22) Filed: Jul. 28, 2016

(65) Prior Publication Data

US 2016/0332768 A1    Nov. 17, 2016

Related U.S. Application Data

(60) Continuation of application No. 13/764,603, filed on Feb. 11, 2013, which is a division of application No.
(Continued)

(30) Foreign Application Priority Data

Jul. 13, 2005  (JP) ................................ 2005-203868
May 30, 2006  (JP) ................................ 2006-149911
May 30, 2006  (JP) ................................ 2006-150228

(51) Int. Cl.
*B65D 1/40*        (2006.01)
*B29B 11/08*       (2006.01)
(Continued)

(52) U.S. Cl.
CPC ................ *B65D 1/40* (2013.01); *B29B 11/08* (2013.01); *B29C 44/0407* (2013.01);
(Continued)

(58) Field of Classification Search
CPC . B29B 11/08; B29C 44/0407; B29C 44/3453; B29C 44/352; B29C 19/0073;
(Continued)

(56) References Cited

U.S. PATENT DOCUMENTS 3,558,751 A    1/1971  Santelli
3,900,120 A    8/1975  Sincock
(Continued)

FOREIGN PATENT DOCUMENTS

CA    2436981 A1    1/1997
EP    1057608 A2    12/2000
(Continued)

OTHER PUBLICATIONS

Communication dated May 12, 2015, issued by the European Patent Office in corresponding European Application No. 15157036.3.
(Continued)

*Primary Examiner* — Kelly M Gambetta
(74) *Attorney, Agent, or Firm* — Sughrue Mion, PLLC

(57) ABSTRACT

This invention provides a plastic container characterized in that an expanded layer comprising expanded cells having a flat shape with an average major axis of not more than 400 μm and an average aspect ratio (L/t) of not less than 6 as viewed in cross section of the container wall along the maximum stretch direction, which are oriented in the stretch direction and are distributed so as to be superimposed on top of each other in the thickness-wise direction, is formed within the container wall. In this container, expanded cells having a flat shape are distributed so as to orient in a given direction and, thus, has light shielding properties and has a pearl-like appearance, that is, has a very high commercial value. Further, since any colorant is not contained, the suitability for recycling is excellent.

12 Claims, 6 Drawing Sheets

Related U.S. Application Data

11/994,751, filed as application No. PCT/JP2006/314021 on Jul. 7, 2006, now Pat. No. 8,397,932.

(51) Int. Cl.

| | | |
|---|---|---|
| *B29B 11/10* | (2006.01) | |
| *B29B 11/12* | (2006.01) | |
| *B29B 11/14* | (2006.01) | |
| *B29C 44/04* | (2006.01) | |
| *B29C 44/34* | (2006.01) | |
| *B29C 49/00* | (2006.01) | |
| *B29C 49/64* | (2006.01) | |
| *B65D 1/02* | (2006.01) | |
| *B29D 22/00* | (2006.01) | |
| B29C 49/06 | (2006.01) | |
| B29K 23/00 | (2006.01) | |
| B29K 25/00 | (2006.01) | |
| B29K 27/06 | (2006.01) | |
| B29K 27/00 | (2006.01) | |
| B29K 55/02 | (2006.01) | |
| B29K 67/00 | (2006.01) | |
| B29K 69/00 | (2006.01) | |
| B29K 77/00 | (2006.01) | |
| B29K 105/04 | (2006.01) | |
| B29L 31/00 | (2006.01) | |

(52) U.S. Cl.
CPC ........ *B29C 44/3453* (2013.01); *B29C 44/352* (2013.01); *B29C 49/0073* (2013.01); *B29C 49/64* (2013.01); *B29D 22/003* (2013.01); *B65D 1/0207* (2013.01); *B65D 1/0246* (2013.01); *B29B 11/10* (2013.01); *B29B 11/12* (2013.01); *B29B 11/14* (2013.01); *B29B 2911/1402* (2013.01); *B29B 2911/1404* (2013.01); *B29B 2911/1408* (2013.01); *B29B 2911/1416* (2013.01); *B29B 2911/1418* (2013.01); *B29B 2911/14026* (2013.01); *B29B 2911/14033* (2013.01); *B29B 2911/1442* (2013.01); *B29B 2911/1444* (2013.01); *B29B 2911/14053* (2013.01); *B29B 2911/14066* (2013.01); *B29B 2911/14093* (2013.01); *B29B 2911/1494* (2013.01); *B29B 2911/14106* (2013.01); *B29B 2911/14126* (2013.01); *B29B 2911/14133* (2013.01); *B29B 2911/14153* (2013.01); *B29B 2911/14213* (2013.01); *B29B 2911/14233* (2013.01); *B29B 2911/14326* (2013.01); *B29B 2911/14328* (2015.05); *B29B 2911/14332* (2015.05); *B29B 2911/14333* (2013.01); *B29B 2911/14466* (2013.01); *B29B 2911/14633* (2013.01); *B29B 2911/14646* (2013.01); *B29B 2911/14653* (2013.01); *B29B 2911/14666* (2013.01); *B29B 2911/14906* (2013.01); *B29B 2911/14913* (2013.01); *B29B 2911/14926* (2013.01); *B29C 49/06* (2013.01); *B29K 2023/065* (2013.01); *B29K 2023/0633* (2013.01); *B29K 2023/12* (2013.01); *B29K 2025/00* (2013.01); *B29K 2027/06* (2013.01); *B29K 2027/08* (2013.01); *B29K 2055/02* (2013.01); *B29K 2067/00* (2013.01); *B29K 2067/006* (2013.01); *B29K 2067/046* (2013.01); *B29K 2069/00* (2013.01); *B29K 2077/00* (2013.01); *B29K 2105/04* (2013.01); *B29K 2995/0041* (2013.01); *B29K 2995/0067* (2013.01); *B29L 2031/7158* (2013.01); *Y10T 428/1376* (2015.01)

(58) Field of Classification Search
CPC .... B29C 49/64; B29D 22/003; B65D 1/0207; B65D 1/0246
See application file for complete search history.

(56) References Cited

U.S. PATENT DOCUMENTS

| | | |
|---|---|---|
| 4,721,643 A | 1/1988 | Harayama et al. |
| 5,223,545 A | 6/1993 | Kumar |
| 5,952,066 A | 9/1999 | Schmidt |
| 6,284,810 B1 | 9/2001 | Burnham |
| 7,588,810 B2 | 9/2009 | Semersky |
| 7,790,255 B2 | 9/2010 | Semersky et al. |
| 2002/0122838 A1 | 9/2002 | Anderson |
| 2004/0086703 A1 | 5/2004 | Semersky |
| 2004/0162358 A1* | 8/2004 | Yamamoto ............ C08J 9/0061 521/79 |
| 2005/0181161 A1 | 8/2005 | Semersky et al. |
| 2006/0051451 A1* | 3/2006 | Hutchinson ........... B29C 33/046 425/552 |

FOREIGN PATENT DOCUMENTS

| | | |
|---|---|---|
| JP | 61-53021 A | 3/1986 |
| JP | H0491920 A | 3/1992 |
| JP | 2000-334759 A | 12/2000 |
| JP | 2003-26137 A | 1/2003 |
| JP | 2006-124019 A | 5/2006 |
| WO | 9732708 A1 | 9/1997 |

OTHER PUBLICATIONS

European Patent Office, "Communication with Extended Search Report," issued in connection with European Patent Application No. 06781095.2, dated Jan. 8, 2014.

\* cited by examiner (a) (b)

Fig. 11

| | Heating time for crystallizing the mouth (s) | Degree of crystallization (%) | Cross sectional photos of threaded portion | Evaluation |
|---|---|---|---|---|
| Example 8 | 60 | 39 | | ○ |
| Example 9 | 52 | 25 | | ○ |
| Example 10 | 50 | 18 | | ○ |
| Example 11 | 47 | 13 | | ○ |
| Ref. Ex. 1 | 0 | 9 | | × |
| Ref. Ex. 2 | 40 | 10 | | × |
| Ref. Ex. 3 | 45 | 12 | | × |

PLASTIC CONTAINER HAVING PEARL-LIKE APPEARANCE AND PROCESS FOR PRODUCING THE SAME

CROSS-REFERENCE TO RELATED APPLICATIONS

This application is a continuation application of U.S. application Ser. No. 13/764,603 filed Feb. 11, 2013 which is a divisional of U.S. application Ser. No. 11/994,751 filed Jan. 31, 2008, now U.S. Pat. No. 8,397,932, which is a National Stage Entry of PCT International Application No. PCT/JP2006/314021 filed Jul. 7, 2006, which claims benefit to Japanese Patent Application No. 2005-203868 filed Jul. 13, 2005, Japanese Patent Application No. 2006-150228 filed May 30, 2006 and Japanese Patent Application No. 2006-149911 filed May 30, 2006. The above-noted applications are incorporated herein by reference to their entirety.

TECHNICAL FIELD

The present invention relates to a plastic container in which foamed cells are distributed in the container wall and pearl-like appearance is imparted thereto due to the foamed cells, and a process for producing the same.

BACKGROUND ART

It has heretofore been known that a plastic container obtained by forming a resin composition containing a scale-like inorganic pigment (e.g., talc) dispersed therein exhibits pearl-like (pearl luster) appearance. That is, light is scattered and reflected in the container wall due to the scale-like pigment. The plastic container exhibiting the pearl-like appearance has a very high commercial value.

In recent years, however, it has been strongly urged to reutilize the resources and attempts have been made to recover the used containers such as the above polyester containers to reutilize them as the recycled resins for a variety of applications. However, the plastic container having the pearl-like appearance is not suited for being recycled. This is because the scale-like inorganic pigment dispersed in the resin for imparting the pearl-like appearance makes it difficult to maintain transparency in the recycled resin.

A patent document 1 is proposing a plastic container imparted with light shielding property by dispersing bubbles (foamed cells) in the container wall.

In the plastic container of the patent document 1, light scattered by the foamed cells distributed in the container wall works to impart light shielding property, and the plastic container is very suited for being recycled since it uses no coloring component such as pigment. However, the plastic container of the patent document 1 has not been imparted with such an aesthetic appearance as pearl-like tone and does not have such an appearance that may enhance commercial value.

Further, when the container is formed by using a resinous foamed material, inconvenience often occurs due to the foaming. That is, a container as represented by a bottle has a threaded portion formed in the mouth portion thereof and a cap can be fitted thereto by screw-fastening. However, if the mouth portion of the container is formed of the foamed material, the strength decreases due to the foam and the dimensional stability decreases in the mouth portion of the container. In particular, a decrease in the dimensional stability at the threaded portion causes a decrease in the sealing performance when the cap is fitted.

To avoid the above problem, patent documents 2 and 3 are disclosing containers of which the body portions and bottom portions are formed of a foamed material but of which the mouth portions are not foamed.

Patent document 1: JP-A-2003-26137
Patent document 2: JP-A-61-53021
Patent document 3: JP-A-10-329203

The patent document 2 forms a preform (parison) in which is entirely distributed a foaming agent such as a decomposable foaming agent like an azo dicarbonimide or sodium bicarbonate, or a freon-type or hydrocarbon-type organic solvent foaming agent, heats the preform so as to be foamed except a portion corresponding to the mouth portion of the container, and stretch blow molds the preform in this state to obtain a container having the mouth portion that is not foamed. According to this method, however, the foaming agent is distributed over the whole preform, and the foaming cannot be effectively suppressed at the mouth portion of the container; i.e., the mouth portion of the container is merely a lowly foamed region where the degree of foaming is low, still leaving room for improvement from the standpoint of suppressing a decrease in the strength of the container mouth portion (threaded portion) and suppressing a decrease in the dimensional stability.

The patent document 3 produces a bottle by melt-kneading various foaming agents and a thermoplastic resin, directly blow-molding a preform while melt-extruding the kneaded mixture, forming a foamed preform by cooling the preform, heating the foamed preform again to a predetermined temperature, and blow-molding the bottle by blowing the air of a predetermined pressure. This method is to produce a bottle through a two-step blow which is a combination of a direct blow and a cold parison blow, and has a feature in that a portion corresponding to the container mouth portion is not expanded at the time of forming the foamed preform and the mouth portion of the finally obtained bottle has not been foamed. Even with this method, however, the foaming agent has been distributed over the whole foamed preform which is an intermediate product like in the patent document 2, and the mouth portion of the container is merely a region that is lowly foamed as compared to the body portion or the bottom portion. Namely, the foaming cannot be completely suppressed in the mouth portion of the container, which is not satisfactory from the standpoint of suppressing a decrease in the strength of the container mouth portion (threaded portion) caused by the foaming and suppressing a decrease in the dimensional stability.

There has further been known a method of separately forming a portion corresponding to the body portion or the bottom portion and a portion corresponding to the mouth portion, and joining the two together after having been formed. According to this method, the body portion and the bottom portion of the container are selectively foamed yet leaving the mouth portion of the container unfoamed. With this method, however, the body portion, bottom portion and mouth portion must be separately formed. Therefore, the productivity is low and the cost of production becomes high. Namely, this method cannot be employed from an industrial point of view.

DISCLOSURE OF THE INVENTION

1. Problems to be Solved by the Invention

It is therefore an object of the present invention to provide a plastic container which does not use a coloring component such as a scale-like inorganic pigment, imparted with a pearl-like appearance due to the distribution of foamed cells, has a high commercial value, and is excellently suited for being recycled, and a method of its production.

Another object of the present invention is to provide a plastic container in which the body portion and the bottom portion of the container are the foamed regions where the foamed cells are selectively formed but no foamed cell is present in the mouth portion of the container where mechanical properties such as strength, etc. are required, and a method of its production.

A further object of the present invention is to provide a preform used for producing the plastic container.

2. Means for Solving the Problems

According to the present invention, there is provided a plastic container comprising a body portion, a bottom portion and a mouth portion formed at an upper end of the body portion, wherein a wall forming at least the body portion and the bottom portion is a foamed region having a foamed layer and in the foamed region, foamed cells of a flat shape having an average long diameter of not larger than 400 µm and an average aspect ratio of not smaller than 6 as viewed in cross section along a maximum stretching direction, are oriented in the stretching direction and are distributed being overlapped one upon the other in a direction of thickness to thereby form the foamed layer.

In the plastic container of the present invention, it is desired that:
(1) An outer surface of the wall in the foamed region is a smooth surface having a surface roughness Ra of not larger than 5 µm;
(2) A skin layer in which no foamed cell is distributed is formed on the outer surface of the wall in the foamed region;
(3) The wall in the foamed region has a 5-layer structure comprising skin layer/foamed layer/core layer/foamed layer/skin layer, and the skin layers and the core layer are unfoamed layers where no foamed cell is present; and
(4) The mouth portion is an unfoamed region without the foamed layer.

According to the present invention, there is further provided a process for producing a plastic container comprising the steps of:
preparing an unfoamed preform formed by integral molding of a thermoplastic resin and imbibing an inert gas;
heating the unfoamed preform to effect foaming to obtain a foamed preform having a foamed layer in a wall, said foamed layer having formed cells which are isotropically distributed; and
stretch blow molding the foamed preform so that the foamed cells assume a flat shape having an average long diameter of not larger than 400 µm and an average aspect ratio of not smaller than 6 as viewed in cross section along a maximum stretching direction.

In the process for producing a plastic container of the present invention, it is desired that:
(1) The thermoplastic resin is, first, formed into an unfoamed preform by integral molding and then an inert gas is imbibed;
(2) The inert gas is released from the surface of the unfoamed preform imbibing the inert gas, and the unfoamed preform is heated to effect the foaming in order to form a skin layer without foamed cell in the surface portion of the foamed preform;
(3) The unfoamed preform imbibing the inert gas is held under normal pressure in a cooled and solidified state, so that the inert gas is released from the surface portion of the unfoamed preform;
(4) The unfoamed preform is held in an inert gas atmosphere of a high pressure, so that the wall of the unfoamed preform imbibes the inert gas except a central portion thereof;
(5) The heating of the unfoamed preform for effecting the foaming is discontinued before the foaming starts in the central portion of the wall, in order to form the core layer where no foamed cell is distributed;
(6) A mouth portion and the vicinity thereof of the unfoamed preform are selectively heat-treated so as to be crystallized, and the inert gas is imbibed in the unformed preform;
(7) The selective heat-treating is effected so that a degree of crystallization in the surface is not smaller than 13%;
(8) The heating for effecting the foaming is selectively executed for the regions corresponding to the container bottom portion and the container body portion of the unfoamed preform, so will not to form the foamed cells in the regions corresponding to the mouth portion and the vicinity thereof of the unfoamed preform; and
(9) The unfoamed preform has the shape of a test tube with its bottom closed, and has, on the outer surface at an upper portion thereof, a neck portion comprising a support ring and a threaded portion positioned above the support ring.

According to the present invention, there is further provided a preform for a container formed by integral molding of a thermoplastic resin, wherein a region corresponding to at least a body portion and a bottom portion of the container is a foamed region, the foamed region forming a foamed layer in which foamed cells are isotropically distributed and a skin layer in which no foamed cell is distributed.

The plastic container is obtained by stretch-forming the preform.

In the preform for a container, it is desired that:
(1) The wall in the foamed region has a 5-layer structure comprising skin layer/foamed layer/core layer/foamed layer/skin layer, and the skin layers and the core layer are the unfoamed layers where no foamed cell is present;
(2) A portion corresponding to the container mouth portion and the vicinity thereof are the unfoamed regions where no foamed cell is present;
(3) The degree of crystallization in the unfoamed region is not smaller than 13%; and
(4) The preform has the shape of a test tube with its bottom closed, and has, on the outer surface at an upper portion thereof, a neck portion comprising a support ring and a threaded portion positioned above the support ring, the neck portion being the unfoamed region.

The plastic container of the present invention contains flat foamed cells of a predetermined size distributed being overlapped one upon the other in the container wall, and exhibits pearl-like appearance offering a very high commercial value. Upon being imparted with the pearl-like appearance by the foamed cells without using a coloring agent such as pigment or a filler, further, the plastic container of the invention is very suited for being recycled.

When a skin layer without the foamed cells is formed on the outer surface side of the container wall, further, smoothness is imparted to the surface enhancing its luster as well as more distinct pearl-like appearance contributing to enhancing aesthetic appearance to the highest degree.

Further, the core layer without the foamed cell is formed in the central portion of the container wall to form a 5-layer structure comprising skin layer/foamed layer/core layer/ foamed layer/skin layer, enhancing the strength and, further, improving gas-barrier property.

The plastic container of the present invention is produced by forming a foamed preform by utilizing the so-called microcellular technology, and stretch-forming the foamed preform. Here, by adjusting the conditions for producing the foamed preform, the mouth portion and the vicinity thereof of the container can be selectively formed as an unfoamed region where no foamed layer is present. In this case, it is allowed to effectively avoid a decrease in the strength of the neck portion of the container that is threaded and a decrease in the dimensional stability thereof.

BRIEF DESCRIPTION OF THE DRAWINGS

FIG. 11 shows the results and cross sectional photographs at Examples 8 to 11 and reference Examples 1 to 3.

BEST MODE FOR CARRYING OUT THE INVENTION

<Plastic Container>

Figure 1:
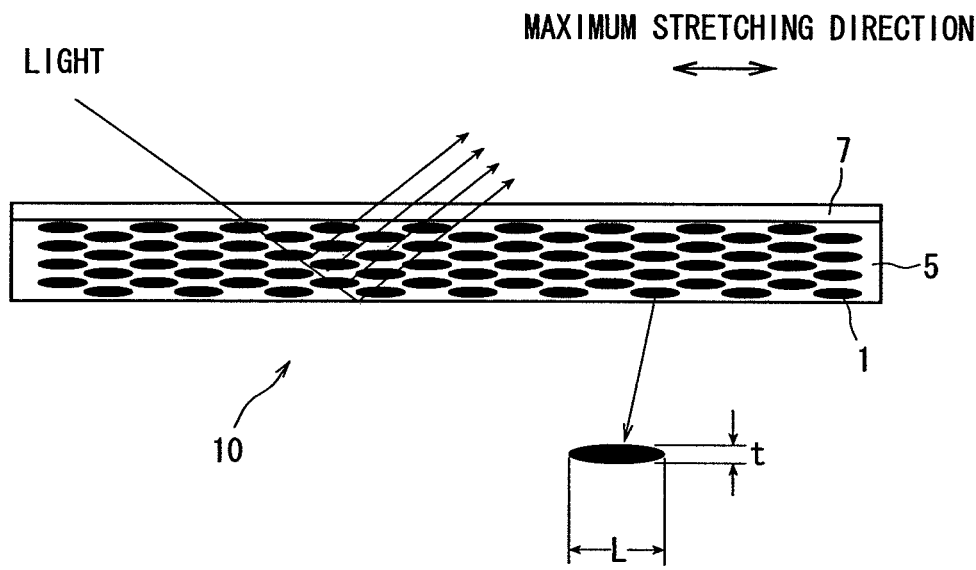
FIG. 1 is a sectional view showing the container wall of a plastic container of the invention along the maximum stretching direction.

A plastic container of the invention will now be described. Referring to FIG. 1 showing the container wall in cross section along the maximum stretching direction, the container wall generally designated at 10 is forming a foamed layer 5 in which foamed cells 1 are distributed. The foamed cells 1 have a flat shape oriented in the maximum stretching direction and are distributed being overlapped one upon the other in the direction of thickness. Therefore, light is scattered and reflected in a multiplexed fashion to exhibit a particular pearl-like appearance. If, for example, the foamed cells 1 have a spherical shape and are not flat, then light is scattered but is little reflected (reflection surfaces are small); i.e., no pearl-like appearance is obtained but light shielding property is simply imparted.

In the present invention, it is also important that the foamed cells 1 have an average long diameter of not larger than 400 μm and, particularly, not larger than 200 μm and an average aspect ratio (ratio L/t of the long diameter L and the thickness t as viewed in cross section) in a range of not smaller than 6 and, particularly, not smaller than 8. That is, if the average long diameter L is larger than the above range, light is scattered less deteriorating the appearance. Further, if the average aspect ratio is smaller than the above range, light reflection surfaces decrease reflecting light less. In either case, satisfactory pearl-like appearance is not obtained.

Further, the foamed cells 1 are overlapped one upon the other in the direction of thickness, preferably, in a number of three or more on average to obtain a sufficient degree of pearl-like appearance.

In the present invention as shown in FIG. 1, further, it is desired to form a skin layer 7 without foamed cell 1 on the surface and, particularly, on the outer surface of the container wall 10. Formation of the skin layer 7 makes it possible to smooth the outer surface of the container wall 10, i.e., to form a smooth surface having an average surface roughness Ra (JIS B 0601) of, for example, not larger than 5 μm. As a result, it is made possible to obtain more highly aesthetic pearl-like appearance. Namely, the luster is enhanced by the surface smoothness and, at the same time, light reflected by the surface interferes with part of light reflected by the foamed cells 1 in the inside exhibiting more distinct pearl-like appearance and the most aesthetic appearance.

Further, formation of the skin layer 7 without the foamed cell 1 is effective in improving the printability of the container as well as in suppressing a decrease in the strength and in the gas-barrier property resulting from the formation of foamed cells 1.

In the present invention, there is no particular limitation on the thickness of the skin layer 7 formed on the outer surface side of the container wall 10 so far as the foamed cells 1 are distributed being overlapped one upon the other at a predetermined degree in the direction of thickness. Usually, however, it is desired that the thickness thereof is about 2 to about 200 μm. If the skin layer 7 is too thin, the thickness becomes irregular and the skin layer 7 fails to stably express the aesthetic appearance. If the thickness is too large, on the other hand, it becomes necessary to increase the thickness of the container wall 10 to obtain a desired pearl-like appearance by maintaining the degree of overlapping of the foamed cells 1 though there is no problem from the standpoint of suppressing a decrease in the strength and in the gas-barrier property.

As described above, the skin layer 3 may be formed on the outer surface side of the container wall 10 but may further be formed on the inner surface side thereof.

Figure 2:
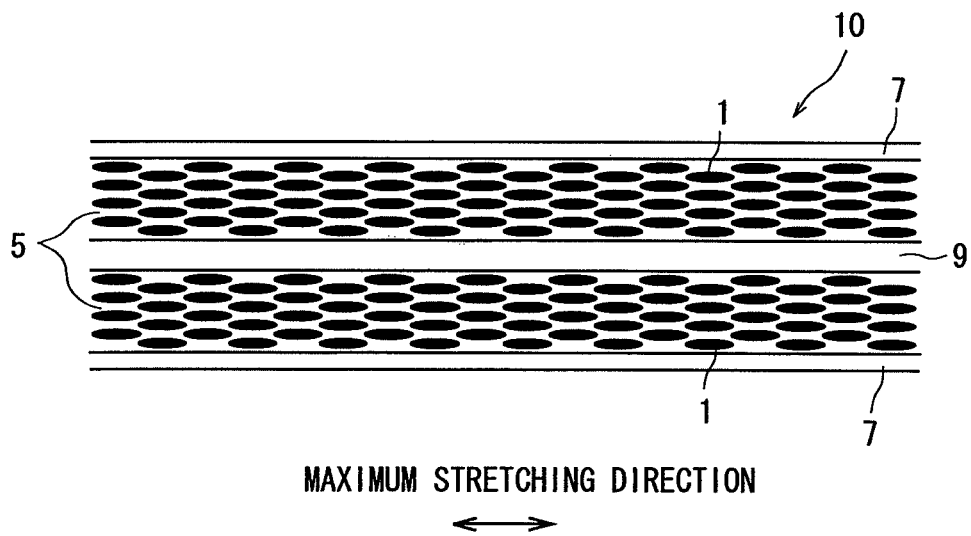
FIG. 2 is a sectional view of a preferred structure of the container wall of the plastic container of the invention along the maximum stretching direction.

In the plastic container of the invention as shown in FIG. 2, further, it is also allowable to form the above-mentioned skin layer 7 on both the outer surface side and the inner surface side of the container wall 10 and to form a core layer 9 without foamed cell 1 in the center thereof. In this case, the container wall 10 possesses a 5-layer structure comprising skin layer 7/foamed layer 5/core layer 9/foamed layer 5/skin layer 7. The plastic container forming the wall of the 5-layer structure features an increased strength and increased gas-barrier property owing to the core layer 9 without foamed cell 1 formed in the central portion. It is desired that the skin layers 7 formed on the outer surface side and on the inner surface side have a thickness in the above-mentioned range, and the core layer 9, too, must have a thickness in a suitable range depending upon the thickness of the container wall 10. That is, if the core layer 9 is too thick, the flat foamed cells 1 are little overlapped one upon the other in the direction of thickness and the pearl-like appearance is spoiled. Therefore, the core layer must have a thickness in a range in which it does not cause the above inconvenience.

According to the present invention, further, the container wall 10 as a whole may be the foamed region forming the foamed layer 5. Generally, however, it is desired that the container mouth portion and the vicinity thereof selectively have no foamed layer 5 (i.e., are unfoamed regions without foamed cell 1).

Figure 3:
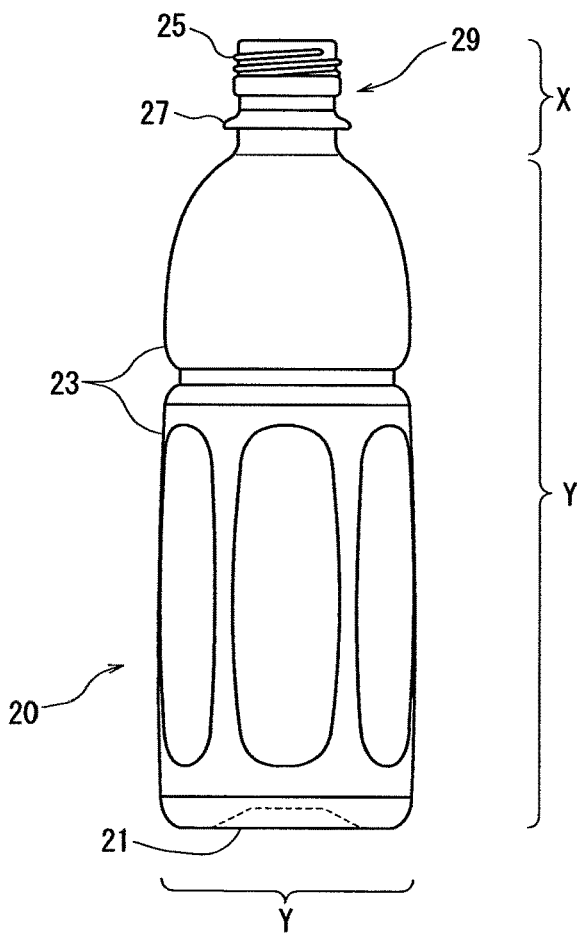
FIG. 3 is a side view of a bottle which is a plastic container of the invention.

FIG. 3 shows a bottle which is an example of the plastic container of the invention. The bottle which is generally designated at 20 in FIG. 3 includes a bottom portion 21 and a body portion 23. A neck portion 29 including a threaded portion 25 and a support ring 27 is formed at an upper end of the body portion. That is, in this bottle 20, the bottom portion 21 and the body portion 23 are constituting a foamed region Y where the foamed layer 5 is formed, exhibiting light shielding property, luster and pearl-like appearance. On the other hand, the neck portion 29 corresponding to the container mouth portion and the vicinity thereof is an unfoamed region X. That is, the neck portion 29 which is the unfoamed region X has a high strength without forming the foamed layer 5 and possesses an excellent dimensional stability. Therefore, the threaded portion 25 enables a cap to be reliably engaged therewith, and the support ring 27 can be gripped assuring a reliable transport.

Figure 4:
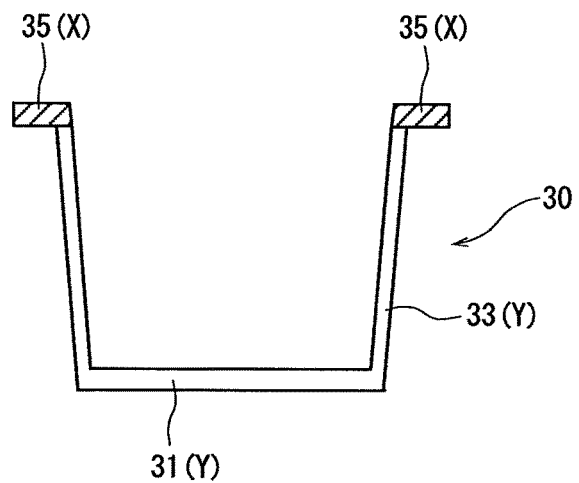
FIG. 4 is a side sectional view of a cup-like container which is a plastic container of the invention.

FIG. 4 shows a cup-like container which is another example of the plastic container of the present invention. In FIG. 4, the cup-like container generally designated at 30 has a bottom portion 31 and a body portion 33. A flange 35 is formed at an upper end of the body portion 33 extending outward. After the container 30 is filled with a content, a sealing foil such as an aluminum foil is adhered and secured to the flange 35 by heat-sealing. In the cup-like container 30, the bottom portion 31 and the body portion 33 are constituting a foamed region Y where the foamed layer 5 is formed, exhibiting light shielding property, luster and pearl-like appearance. Further, the flange 35 corresponding to the container mouth portion and the vicinity thereof is an unfoamed region X forming no foamed layer 5. Therefore, the flange 35 has a high strength, a high dimensional stability, and exhibits excellent heat-sealing property.

The above-mentioned plastic container of the present invention having the foamed layer 5 in which the foamed cells 1 are distributed in the container wall 10, is produced by a physical foaming method imbibing an inert gas therein as will be described later. Therefore, there is no particular limitation on the resin constituting the container wall 10 so far as it is capable of imbibing an inert gas, and any known thermoplastic resin can be used. For example, the container wall 10 can be formed by using olefin resins such as random or block copolymers of α-olefins or cyclic olefin copolymers, like low-density polyethylene, high-density polyethylene, polypropylene, poly 1-butene, poly 4-methyl-1-pentene or ethylene, propylene, 1-butene and 4-methyl-1-pentene; ethylene/vinyl copolymers such as ethylene/vinyl acetate copolymer, ethylene/vinyl alcohol copolymer, and ethylene/vinyl chloride copolymer; styrene resins such as polystyrene, acrylonitrile/styrene copolymer, ABS, and α-methylstyrene/styrene copolymer; vinyl resins such as polyvinyl chloride, polyvinylidene chloride, vinyl chloride/vinylidene chloride copolymer, methyl polyacrylate and methyl polymethacrylate; polyamide resins such as nylon 6, nylon 6-6, nylon 6-10, nylon 11 and nylon 12; polyester resins such as polyethylene terephthalate, polybutylene terephthalate, polyethylene naphthalate and copolymerized polyesters thereof; polycarbonate resin; polyphenylene oxide resin; and a biodegradable resin such as polylactic acid. The container wall 10 may be formed by a blend of these thermoplastic resins. It is, particularly, desired to use an olefin resin or a polyester resin that is favorably used in the field of containers. Among them, the polyester resin is most desired from the standpoint of utilizing the advantage of the present invention to the greatest degree.

Further, the container wall 10 is not limited to the one of a single-layer structure but may be of a multi-layer structure having a gas-barrier layer of, for example, an ethylene/vinyl alcohol copolymer resin, as well as a polyolefin resin layer or a polyester resin layer adhered thereon via an adhesive layer of, for example, a vinyl acetate copolymer resin. If the necessity for being recycled is neglected, the container wall 10 may have a layer structure provided with a gas-barrier layer having an oxygen-absorbing agent such as an iron powder dispersed in the resin layer.

<Production of the Plastic Container>

Figure 5:
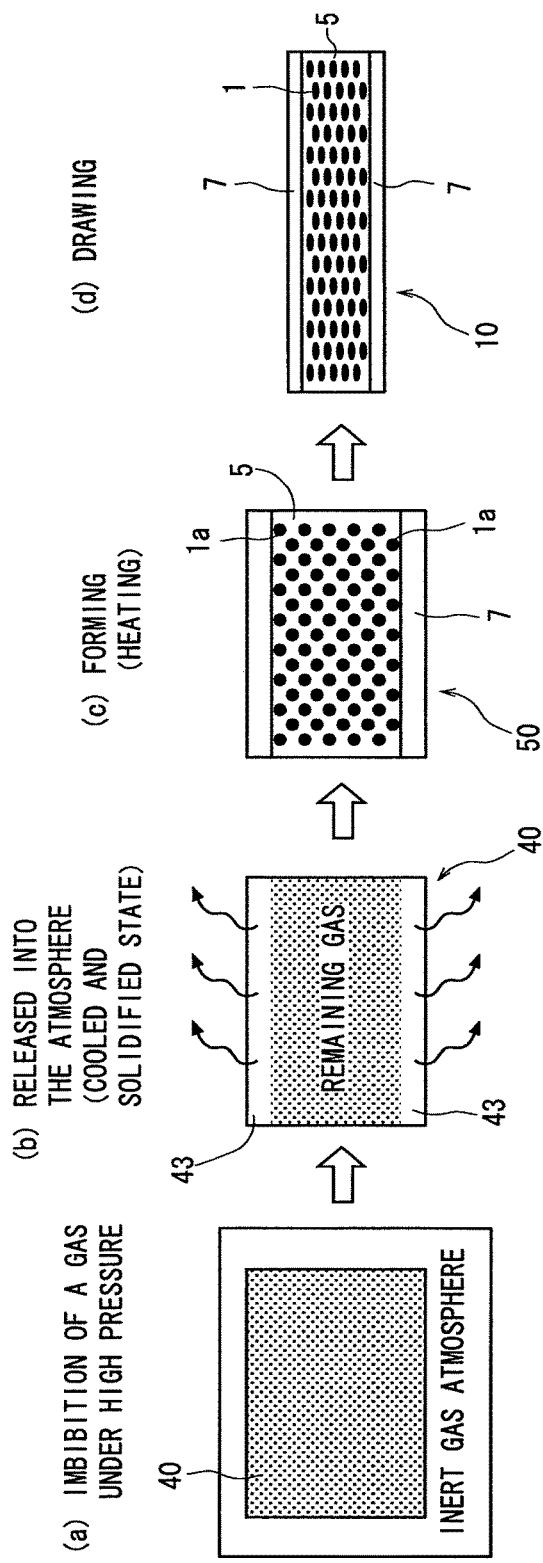
FIG. 5 is a view schematically illustrating representative steps in a production process according to the invention.

The plastic container having the pearl-like appearance of the present invention is produced by preparing an unfoamed preform imbibing, for example, an inert gas, heating the unfoamed preform to obtain a foamed preform, and stretch blow molding the foamed preform. FIG. 5 schematically illustrates a representative example of the production process.

Referring to FIG. 5, first, an unfoamed preform 40 is prepared by using the above-mentioned starting resin and is placed under a high pressure condition so as to imbibe an inert gas (e.g., carbonic acid gas or nitrogen gas) permitting the inert gas to dissolve therein (step (a)).

The unfoamed preform 40 can be formed by known forming means such as extrusion forming, injection forming or compression forming. Usually, the unfoamed preform 40 has the shape of a test tube when it is attempted to produce a container of the shape of a bottle and has the shape of a plate or a cup when it is attempted to produce a container of the shape of a cup. When it is attempted to produce a container having a multi-layer structure provided with a gas-barrier layer, the unfoamed preform 40 is so formed as to possess a multi-layer structure corresponding thereto by co-extrusion or co-injection.

The unfoamed preform 40 imbibes the inert gas through the above step (a) such that the gas is dissolved therein in amounts sufficient for forming flat foamed cells 1 to exhibit desired pearl-like appearance. For example, the unfoamed preform 40 may be heated to imbibe the inert gas under a high pressure or may not be heated. If the temperature is high, the gas dissolves in decreased amounts but is imbibed at a high rate. If the temperature is low, the gas dissolves in increased amounts but an increased period of time is needed for the imbibing.

If the gas is imbibed under the heated condition, attention should be given so that the temperature of the unfoamed preform 40 (particularly, the temperature of the body portion 2 and bottom portion 3) does not exceed the thermal crystallization temperature of the starting resin. If heated higher than the crystallization temperature, the body portion 2 and the bottom portion 3 are crystallized imposing limitation on the foaming in the subsequent step of foaming.

Next, the unfoamed preform 40 is placed under normal pressure (atmospheric pressure) in a cooled and solidified state for a predetermined period of time, letting the inert gas to be released from the surface of the unfoamed preform 40 to thereby form a surface layer 43 where no inert gas is dissolved or the inert gas concentration is low (step (b)). That is, the inert gas does not almost dissolve under normal pressure and at normal temperature. Upon holding the cooled and solidified unfoamed preform 40 under normal pressure, therefore, the inert gas is gradually released from the surface of the preform 40.

The surface layer 43 corresponds to the skin layer 7 where no foamed cell 1 is present. The thickness of the skin layer 7 can be adjusted by adjusting the time in which the preform is placed under normal pressure in the state of being cooled and solidified. That is, the thickness of the surface layer 43 increases with an increase in the time for placing the preform under normal pressure and, therefore, the thickness of the skin layer 7 can be increased. The thickness of the surface layer 43 decreases with a decrease in the time for placing the preform under normal pressure and, therefore, the thickness of the skin layer 7 can be decreased. Attention, however, should be given to that if the time for placing the preform under normal pressure is too lengthened, the inert gas is almost released making it difficult to form flat foamed cells 1 in amounts sufficient for exhibiting the pearl-like appearance.

When the skin layer 7 is not to be formed, the above step is not necessary, and the process is readily shifted to a step (c) described below.

In the example of FIG. 5, the surface layers 43 are formed on both surfaces (outer surface side and inner surface side) of the unfoamed preform 20. When the surface layer 43 is formed on one surface (outer surface side) only to produce the container having the skin layer 7 formed on the outer surface side only, the unfoamed preform 40 of the shape of, for example, a test tube is placed under normal pressure with its mouth portion closed or the one surface (inner surface side) of the unfoamed preform 40 of the shape of a plate is closely adhered to a suitable support member and the outer surface only is exposed to the atmosphere of normal pressure.

Next, the unfoamed preform 40 forming the surface layer 43 is heated by using an oil bath or an infrared-ray heater to effect the foaming (step (c)). Due to this heating, bubbles evolve in the unfoamed preform 40 in which the inert gas is remaining, and a foamed preform 50 is obtained having a foamed layer 5 in which the foamed cells 1a are distributed. Here, no inert gas is present or its concentration is low in the surface layer 43 of the unfoamed preform 40. Therefore, even if heated, the surface layer is not foamed or is formed to a degree that cannot be confirmed unless carefully observed. Namely, surface layer remains as the unfoamed region where no foamed cell 1a is present in the foamed preform 50, and the skin layer 7 is thus formed.

The heating temperature for foaming is higher than a glass transition point of the resin forming the unfoamed preform 50. The heating causes a quick change in the internal energy (free energy) of the inert gas dissolved in the resin, triggering phase separation and forming foam that is separated as bubbles from the resin. The heating temperature should not be higher than a melting point, desirably, not higher than 200° C. to prevent the foamed preform 50 from deforming. If the heating temperature is too high, foaming occurs abruptly after being heated making it difficult to control cell diameters, deteriorating the appearance, causing the body portion to be crystallized and lowering the secondary formability.

The foamed cells 1a (hereinafter often called spherical foamed cells) formed as described above in the foamed preform 50 are substantially of a spherical shape and are isotropically distributed. In this stage, therefore, light shielding property is exhibited but pearl-like appearance is not still exhibited. To exhibit the pearl-like appearance, therefore, a stretch-forming (stretch blow molding) becomes necessary as will be described later.

Further, the cell density of the spherical foamed cells 1a (density in the region excluding the skin layer 7) varies depending upon the amount of the inert gas that is dissolved. If the dissolved amount is large, the cell density becomes high and the diameters of the spherical foamed cells become small. If the dissolved amount is small, the cell density becomes low and the diameters of the spherical foamed cells 1a become large. Further, the diameters of the spherical foamed cells 1a can be adjusted relying upon the heating time. If the heating time for foaming is long, the diameters of the spherical foamed cells 1a increase. If the heating time is short, the diameters of the spherical foamed cells 1a decrease. According to the present invention, the above conditions are adjusted so that the cell density of the spherical foamed cells 1a in the foamed layer 5 becomes about $10^6$ to about $10^9$ cells/cm$^3$ and the average diameter becomes about 5 to 50 μm from the standpoint forming flat foamed cells 1 having the above-mentioned thickness t and average aspect ratio as well as a suitable degree of overlapping in the direction of thickness through the stretch-forming that will be described later.

In the forming step (c), further, when the heating for foaming is effected from the side of the one surface (particularly, from the side of the inner surface) of the unfoamed preform 40, the spherical foamed cells 1a are successively formed from the side of the inner surface. By utilizing this, therefore, it is possible to form the skin layer 7 in which no spherical foamed cell 1a is present on the outer surface side without releasing the inert gas (without effecting the above step (b)). That is, if the heating is discontinued before the spherical foamed cells 1a are formed over the whole thickness of the unfoamed preform 40, then the foamed preform 50 is obtained having the skin layer 7 on the outer surface side only.

In the above-mentioned embodiment, further, the inert gas is imbibed after the unfoamed preform 40 is formed (step (a)). However, the inert gas can also be imbibed by feeding the inert gas maintaining a predetermined pressure to the resin held in a heated and molten state in the resin-kneading portion or in the plasticizing portion in a forming machine such as an extruder, an injection-forming machine or a compression-forming machine for forming the unfoamed preform. Or, the foaming by heating can be executed at one time in the forming machine. However, the foaming by heating executed at one time in the forming machine is not suited for forming the skin layer 7 in which no foamed cell 1a is present. In this case, further, the foamed cells 1a assume a shape that is slightly flattened in a direction in which the resin flows. In this case, therefore, it is desired that the foamed cells have an average diameter in a range the same as the range of the average diameter described above concerning the spherical foamed cells 1a in the portion along the surface in the maximum stretching direction.

To form the foamed preform 50 of the 5-layer structure according to the present invention, the atmosphere of a high pressure may be returned back to normal pressure to discontinue the imbibing before the gas infiltrates up to the central portion of the wall of the unfoamed preform 40 in the step (a) of imbibing the inert gas described above. That is, no inert gas that is a source of foaming is present in the central portion of the wall of the unfoamed preform 40. By executing the above-mentioned step (b) of releasing the inert gas and the step (c) of foaming, therefore, it is made possible to obtain the foamed preform 50 of the 5-layer structure shown in FIG. 6. That is, in the foamed preform 50, the core layer 9 having no spherical foamed cell 1a is formed in the central portion of the wall, and foamed layers 5 having spherical foamed cells 1a distributed therein are present among the core layer 9 and the skin layers 7 formed on the outer surface side and on the inner surface side.

In the step (c) of foaming, further, the heating for foaming is effected by blowing the hot air from both surfaces (outer surface side and inner surface side) of the unfoamed preform 40. Here, the heating is discontinued before the spherical foamed cells 1a are formed in all of the internal portion except the surface layer 43 to thereby form the core layer 9 in the central portion where no spherical foamed cell 1a is formed. Even by this method, it is made possible to form the foamed preform 50 having the 5-layer structure as shown in FIG. 6, i.e., having the layer structure comprising skin layer 7/foamed layer 5/core layer 9/foamed layer 5/skin layer 7.

Figure 6:
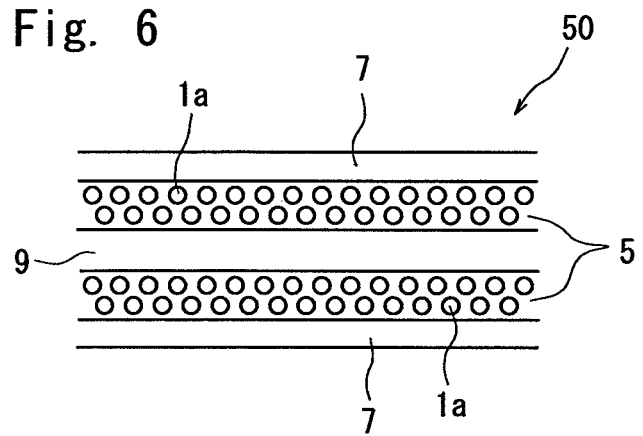
FIG. 6 is a sectional view showing the structure of a container wall of a preform (foamed preform) for a container obtained through the production steps of the invention.

Therefore, the foamed preform 50 of the 5-layer structure shown in FIG. 6 is subjected to the step (d) of stretching to produce a plastic container having the wall 10 of the 5-layer structure shown in FIG. 2 forming the body portion and the bottom portion thereof and exhibiting improved strength and gas-barrier property.

In the step (d) of stretch-forming the foamed preform 50, the draw-forming is effected according to a known method. For example, the preform is heated at a temperature higher than a glass transition temperature of the resin but lower than a melting point thereof, and is stretched by a vacuum-forming as represented by a blow-molding or a plug-assisted forming to obtain a bottle (see FIG. 3) or a cup-like container (see FIG. 4) having the foamed layer 5 in which the foamed cells 1 are distributed as the spherical foamed cells 1a are deformed into a flat shape as shown in FIG. 1 (or FIG. 2). It is, further, possible to obtain a bag-like container by using a film which is obtained by stretch-forming the foamed preform 50 of the shape of a sheet.

The stretching is effected to a suitable degree of stretching ratio depending upon the diameter of the foamed cells 1a and the cell density in the foamed preform 50, so that the thickness t and aspect ratio of the foamed cells lie in the above-mentioned ranges in cross section in the maximum stretching direction. For example, in the stretch-forming (stretch blow molding) effecting the stretching in the two axial directions, i.e., in the axial direction (direction of height) and in the circumferential direction, the stretching ratio is, usually, about 2 to about 4 times in these directions. In the plug-assisted forming effecting the stretching in the monoaxial direction, i.e., in the axial direction only, the stretching in this direction is in the maximum stretching direction effecting the stretching at the same stretching ratio as above.

When the plastic container of the present invention is produced according to the above-mentioned process, the glass transition point of the resin decreases linearly or exponentially with an increase in the amount of dissolution of the inert gas. Further, the gas that is dissolved varies the viscoelasticity. For instance, the viscosity of the resin decreases with an increase in the amount of dissolution of the gas. By taking the amount of dissolution of the inert gas into consideration, therefore, the conditions should be so set that the flat cells 1 are formed so as to exhibit pearl-like appearance.

<Production of the Plastic Container Having Unfoamed Region>

When the plastic container is produced by the above-mentioned method, it is desired that the container mouth portion and the vicinity thereof are forming an unfoamed region where the foamed layer 5 has not been formed as described with reference to FIGS. 3 and 4. The container having the unfoamed region can be produced by two methods. These methods will be described below with reference to the case of producing a bottle.

Method 1:

One method is to execute the selective crystallization prior to the above-mentioned step (a) of imbibing the gas.

Figure 7:
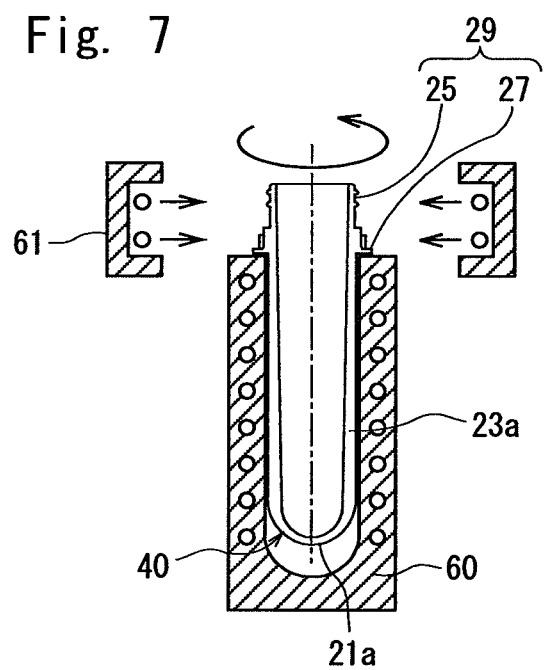
FIG. 7 is a view illustrating a step of selective crystallization for selectively forming the neck portion of the bottle to be an unfoamed region.

That is, referring to FIG. 7 showing the step of crystallization, an unfoamed preform 40 having the shape of a test tube as a whole is provided. The unfoamed preform 40 has a bottom portion 21a and a body portion 23a. A neck portion 29 having a threaded portion 25 and a support ring 27 is formed above the body portion 23a (the neck portion 29 corresponds to the neck portion 29 of the bottle 20 of FIG. 3). The unfoamed preform 40 is formed by a known forming method such as the injection forming or the compression forming as described above.

In order to form the neck portion 29 as the unfoamed region according to this method, this portion is, first, selectively crystallized to suppress the foaming in the step (c) of foaming.

The neck portion 29 is selectively crystallized by selectively heating this portion at a temperature higher than a crystallization temperature of the crystalline thermoplastic resin used as the starting material but lower than a melting point thereof, and gradually cooling it after having been heated. As the heating means, any means can be employed provided it is capable of selectively heating the neck portion 29. As shown in FIG. 7, for example, there can be employed means for heating the neck portion 29 by using such heating means 61 as an infrared-ray heater, a quartz heater or a heated metal mold while holding the bottom portion 21a and the body portion 23a by a jig 60 provided with a cooling water pipe.

According to the present invention, it is desired to crystallize the surface of the neck portion 29 to a degree (laser-Raman method) of not less than 13%, preferably, not less than 30% and, most preferably, not less than 40% by the above-mentioned means. The higher the degree of crystallization, the more reliably the foaming can be avoided in the neck portion 29 in the step (c) of foaming, and the foamed layer 5 can be selectively formed in the bottom portion 21a and in the body portion 23a. To increase the degree of crystallization of the neck portion 29, the time may be lengthened for holding the neck portion 29 in, for example, the region of the crystallizing temperature.

The unfoamed preform 40 having the neck portion 29 that is selectively and thermally crystallized as described above is subjected to the above-mentioned step (a) of imbibing the gas so as to imbibe the inert gas. For example, the unfoamed preform is introduced into a sealed chamber, the inert gas is fed into the chamber, and the pressure is maintained high in the chamber so that the inert gas infiltrates into the unfoamed preform 40. In this case, the neck portion 29 of the unfoamed preform 40 has been selectively crystallized. In the step of imbibing the gas, therefore, the inert gas infiltrates into the region (bottom portion 21a and body portion 23a) excluding the neck portion 29. In the neck portion 29 that has been crystallized, the resin is very suppressed from being plasticized due to the crystallization, and the inert gas is not almost imbibed. In the step (c) of foaming after the step (b) of releasing the gas, therefore, the bottom portion 21a and the body portion 23a only are foamed, but the neck portion 29 is not foamed. In this case, even if the inert gas may infiltrate in small amounts into the neck portion 29, the resin of the neck portion 29 is suppressed from being plasticized due to the crystallization. In this case, too, therefore, the bubbles are effectively suppressed from growing, and foaming is reliably prevented.

Figure 8:
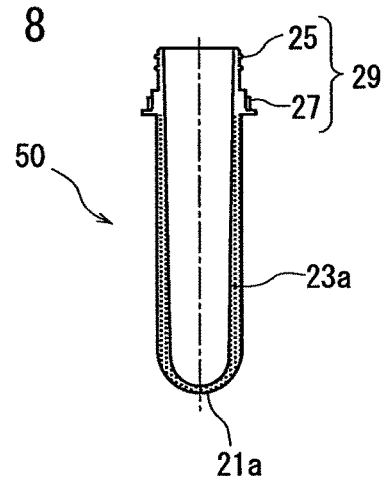
FIG. 8 is a side sectional view showing a foamed preform (preform for a container) used for forming a bottle of which the neck portion is selectively formed as an unfoamed region.

After having executed the foaming as described above, the preform is cooled to discontinue the foaming. As shown in FIG. 8, therefore, there is obtained a preform for a container (foamed preform) 50 having the bottom portion 21a and the body portion 23a forming the foamed region Y containing the foamed layer 5 therein, and having the neck portion 29 that is forming the unfoamed region X. Namely, the neck portion 29 forms the unfoamed region X, and the bottom portion 21a and the body portion 23a form the foamed region Y, the region Y forming the foamed layer 5 and the skin layer 7 or the core layer 7. By subjecting the preform to the above-mentioned step (d) of stretching, there is obtained the bottle 20 shown in FIG. 3 having the neck portion 29 formed as the unfoamed region X and having the bottom portion 21 and the body portion 23 formed as the foamed region Y.

Method 2:

According to this method, the unfoamed preform 40 is subjected to the step (a) of imbibing the gas and the step (b) of releasing the gas followed by the selective and thermal foaming in the step (c) of foaming according to the above-mentioned process shown in FIG. 5.

Figure 9:
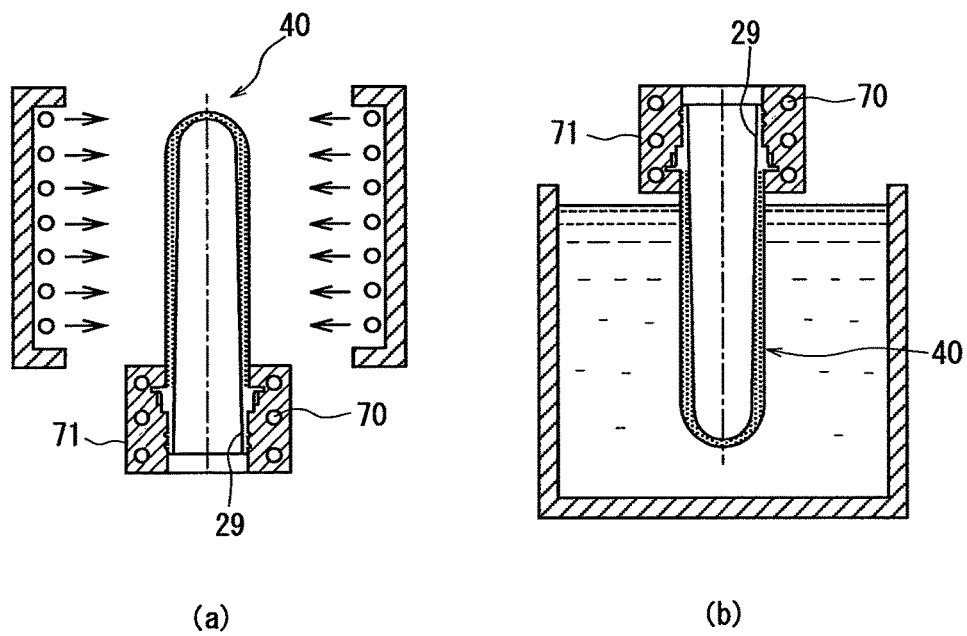
FIG. 9 is a view illustrating a step of foaming by the selective heating for selectively forming the neck portion of the bottle to be an unfoamed region.

That is, as shown in FIG. 9(a) or 9(b), the neck portion 29 of the unfoamed preform 40 is held by a holding metal mold 71 equipped with a cooling water pipe 70, and the bottom portion 21a and the body portion 23a are heated at a predetermined foaming temperature by using an oil bath or an infrared-ray heater while cooling the neck portion 29. Through the above selective heating, the bottom portion 21a and the body portion 23a are selectively foamed while reliably avoiding the foaming in the neck portion 29 to obtain the preform 50 for the container as shown in FIG. 8 like the method 1. The preform is subjected to the above-mentioned step (d) of stretching to obtain the bottle 20 shown in FIG. 3 having the neck portion 29 forming the unfoamed region X and having the bottom portion 21 and the body portion 23 forming the foamed region Y.

Figure 10:
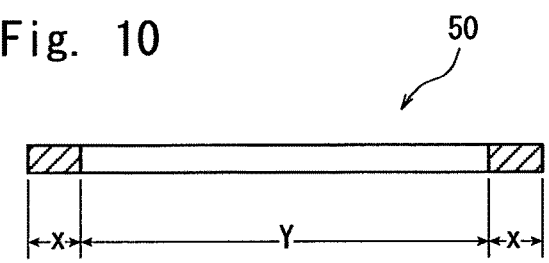
FIG. 10 is a side sectional view showing a sheet-like foamed preform (preform for a container) used for forming a cup-like container having a flange that is selectively formed to be an unfoamed region.

Though the preform in the shape of a test tube was described above, it is also possible to produce a foamed preform having the unfoamed region X and the foamed region Y by using a sheet-like unfoamed preform, as a matter of course. When the sheet-like unfoamed preform is used, there is obtained a sheet-like preform for a container (foamed preform) 50 as shown in FIG. 10. In this preform 50, the circumferential edge corresponding to the container mouth portion is forming the unfoamed region X, and the central portion corresponding to the bottom portion and the body portion is forming the foamed region Y which is forming the foamed layer 5, skin layer 7 and core layer 9. By draw-forming the preform 50 for a container, a cup-like container 30 can be obtained as shown in FIG. 4.

The plastic container of the present invention obtained as described above exhibits pearl-like appearance and has a very high commercial value. Particularly, the plastic container forming the skin layer 7 without foamed cell 1 has a smooth surface, exhibiting particularly excellent aesthetic pearl-like appearance and features good printability, too. Because of its light shielding property, further, the plastic container can be effectively used for containing a content that may undergo degeneration. Without being blended with any coloring agent, further, the plastic container is suited for being recycled. Further, formation of the foamed cells contributes to decreasing the weight and attaining improved heat-insulating property.

Moreover, the container having the 5-layer structure forming the core layer 9 therein features high gas-barrier property and high strength.

Further, the bottle has the neck portion corresponding to the container mouth portion and the vicinity thereof forming the unfoamed region, and features a high dimensional stability of the threaded portion and enables a reliable sealing structure to be formed upon being engaged with the cap. The support ring has a high mechanical strength and effectively prevents the breakage at the time of transport or working by gripping the support ring. Moreover, the cup-like container of which the flange is forming an unfoamed region features favorable heat-sealing property and makes it possible to form a reliably sealed structure upon being heat-sealed with a sealing foil such as aluminum foil.

EXAMPLES

Example 1

An unfoamed preform having a body wall thickness of 3 mm for forming a 500-ml bottle was prepared by injection-forming a homo-PET (polyethylene terephthalate) having an intrinsic viscosity (IV) of 0.84 dL/g.

The preform was set in a pressure-resistant container maintained at 40° C. and was held under a pressure of 15 MPa for one hour so as to imbibe the carbonic acid gas. Thereafter, the pressure was decreased down to the atmospheric pressure, the preform was taken out of the pressure-resistant container and was held under the atmospheric pressure for 5 minutes. Further, hot water maintained at 90° C. was sprayed onto the outer surface of the preform for 10 seconds to effect the foaming, and there was obtained a foamed preform including a foamed layer having a cell density of $8.5 \times 10^7$ cells/cm$^3$ and a thickness of 180 μm, and a skin layer of a thickness of 70 μm on the outer surface thereof.

From a photograph of cross section, the cell density was calculated in compliance with the following formula, $$N_f = (n/A)^{3/2}$$

$N_f$: cell density (/cm$^3$),
A: sectional area observed,
n: number of cells in the sectional area A.

The thus obtained foamed preform was stretch-formed into a bottle drawn into 2 times longitudinally and 2 times transversely. There was obtained a foamed PET bottle having an average thickness of 0.68 mm in the side body portion of the container, an average surface roughness Ra of 0.5 μm, a skin layer of 17 μm, an average long diameter of bubbles of 29 μm in the foamed layer, an average aspect ratio of bubbles of 8.7, and exhibiting favorable pearl-like luster.

The average long diameter and the average aspect ratio were average values of 5 to 50 cells found by processing the images of bubbles of a photograph of cross section and by using a software for measuring the shape.

The surface roughness was an average roughness Ra along the center line measured in compliance with the JIS B 0601 by using a surface roughness-measuring instrument.

The luster was evaluated by eyes and was decided on the following basis.

⊚: Particularly excellent in both appearance and pearl-like luster.
○: Favorable in both appearance and pearl-like luster.
Δ: At least either the appearance or the pearl-like luster is not desirable.

X: At least either the appearance or the pearl-like luster is very poor.

Example 2

The foamed preform prepared in the same manner as in Example 1 was stretch-formed into a bottle drawn into 3 times longitudinally and 3 times transversely. There was obtained a foamed PET bottle having an average thickness of 0.32 mm in the side body portion, an average surface roughness Ra of 0.3 μm, a skin layer of 10 μm thick, an average long diameter of bubbles of 42 μm in the foamed layer, an average aspect ratio of bubbles of 11.6, and exhibiting favorable appearance and pearl-like luster.

Example 3

By using a copolymerized PET containing 5 mol % of isophthalic acid and having an intrinsic viscosity (IV) of 0.90 dL/g and by using a T-die based on an extrusion foam-forming method using the carbonic acid gas as a foaming agent, there was obtained a foamed sheet having an average thickness of 0.58 mm and a cell density of $4 \times 10^6$ cells/cm$^3$. Here, the T-die temperature was suitably controlled so that the sheet surface became smooth. The thus obtained foamed sheet was drawn by using a biaxial stretching machine into 2 times longitudinally and 2 times transversely, and was heat-sealed to obtain a pouch-like container. There was obtained a pouch having an average container thickness of 0.16 mm, an average surface roughness Ra of 4.3 μm, an average long diameter of bubbles of 101 μm in the foamed layer, an average aspect ratio of bubbles of 8.4, and exhibiting smooth appearance and favorable pearl-like luster.

Example 4

The foamed sheet prepared in the same manner as in Example 3 was stretched into 3 times longitudinally and 3 times transversely by using the biaxial stretching machine, and was heat-sealed to form a pouch-like container. There was obtained a pouch having an average container thickness of 0.07 mm, an average surface roughness Ra of 1.9 μm, an average long diameter of bubbles of 107 μm in the foamed layer, an average aspect ratio of bubbles of 15.7, and exhibiting smooth appearance and excellent pearl-like luster.

Example 5

The foamed sheet prepared in the same manner as in Example 3 was stretched into 4 times longitudinally and 4 times transversely by using the biaxial stretching machine, and was heat-sealed to form a pouch-like container. There was obtained a pouch having an average container thickness of 0.05 mm, an average surface roughness Ra of 1.4 μm, an average long diameter of bubbles of 102 μm in the foamed layer, an average aspect ratio of bubbles of 19.8, and exhibiting smooth appearance and excellent pearl-like luster.

Example 6

A foamed sheet having a cell diameter larger than that of Example 3 was obtained by forming a foamed sheet in the same manner as that of Example 3 but lowering the pressure for feeding the carbonic acid gas and setting the T-die temperature to be high. An unfoamed PET sheet was laminated thereon to prepare a two-layer sheet comprising the foamed layer and the unfoamed layer. The two-layer sheet was stretched into 3 times longitudinally and 3 times transversely by using the biaxial stretching machine, and was heat-sealed to form a pouch-like container. There was obtained a pouch having an average container thickness of 0.12 mm, an average surface roughness Ra of 0.8 μm, an average long diameter of bubbles of 240 μm in the foamed layer, an average aspect ratio of bubbles of 18.5, and exhibiting smooth appearance and favorable pearl-like luster.

Example 7

The foamed sheet prepared in the same manner as in Example 3 was stretched into 4 times longitudinally and 1 time transversely by the plug-assisted forming to form a cup. There was obtained a cup-like container having an average container thickness of 0.26 mm, an average surface roughness Ra of 2.3 μm, an average long diameter of bubbles of 103 μm in the foamed layer, an average aspect ratio of bubbles of 8.2, and exhibiting favorable appearance and pearl-like luster.

Comparative Example 1

A foamed preform produced in the same manner as in Example 1 was stretch-formed into a bottle being drawn into 1.5 times longitudinally and 1.5 times transversely. There was obtained a foamed PET bottle having an average container thickness of 1.2 mm in the side body portion, an average surface roughness Ra of 0.5 μm, an average long diameter of bubbles of 22 μm in the foamed layer, and an average aspect ratio of bubbles of 5.1. The container exhibited a white color and excellent light shielding property. However, the pearl-like luster was not favorable due to the lack of reflected light.

Comparative Example 2

A foamed preform produced in the same manner as in Example 1 was stretch-formed by using a blow metal mold which has a matt finish surface, into a bottle being drawn into 3 times longitudinally and 3 times transversely. There was obtained a foamed PET bottle having an average container thickness of 0.31 mm in the side body portion, an average surface roughness Ra of 6.2 μm, an average long diameter of bubbles of 45 μm in the foamed layer, and an average aspect ratio of bubbles of 12.0. However, the luster was poor and the appearance was not favorable due to the lack of reflected light in the surface.

Comparative Example 3

A foamed sheet prepared in the same manner as in Example 3 was formed into a tray-like container by the compressed air forming. There was obtained a foamed tray having an average container thickness of 0.58 mm, an average surface roughness of 3.3 μm, an average long diameter of bubbles of 24 μm in the foamed layer, and an average aspect ratio of bubbles of 1.3. However, both the appearance and the pearl-like luster were not favorable.

Comparative Example 4

A foamed sheet prepared in the same manner as in Example 3 was stretched by using the biaxial stretching machine into 1.5 times longitudinally and 1.5 times transversely, and was heat-sealed to obtain a pouch-like container. There was obtained a pouch having an average container thickness of 0.34 mm, an average surface roughness Ra of 4.0 μm, an average long diameter of bubbles of 72 μm in the foamed layer, and an average aspect ratio of bubbles of 4.3. However, the pearl-like luster was not favorable.

Comparative Example 5

A foamed sheet was prepared in the same manner as in Example 6, and was stretched by using the biaxial stretching machine into 3 times longitudinally and 3 times transversely without laminating the unfoamed PET sheet thereon, and was heat-sealed to obtain a pouch-like container. There was obtained a pouch having an average container thickness of 0.10 mm, an average surface roughness Ra of 6.8 μm, an average long diameter of bubbles of 204 μm in the foamed layer, and an average aspect ratio of bubbles of 17.6. Without the skin layer, however, the surface was rough, and the luster was poor and the appearance was defective as compared to Example 6.

Comparative Example 6

A foamed sheet having a larger cell diameter was prepared by decreasing the pressure of the carbonic acid gas to be lower than that of Example 6. The T-die temperature was set to be low so that the surface roughness of the sheet was small. The foamed sheet was stretched by using the biaxial stretching machine into 3 times longitudinally and 3 times transversely, and was heat-sealed to obtain a pouch-like container. There was obtained a foamed pouch having an average container thickness of 0.11 mm, an average surface roughness Ra of 2.3 μm, an average long diameter of bubbles of 719 μm in the foamed layer, and an average aspect ratio of bubbles of 15.6. However, since the container possessed large bubbles and a small cell density, light was little scattered or reflected, and the pearl-like luster was poor. Besides, since the flat bubbles were so large as can be seen by naked eyes, the appearance was not good.

Table 1 shows the evaluated results of Examples 1 to 7 and comparative Examples 1 to 6.

The following experiments deal with the containers of when the unfoamed region was formed in the mouth portion of the containers.

Example 8

A polyethylene terephthalate resin (PET) having an intrinsic viscosity of 0.84 was injection-formed into an unfoamed preform of the shape of a test tube having a body portion, a bottom portion and a neck portion (inner diameter of neck portion: 21.6 mm, thickness of body portion: 3 mm, content: 25.4 ml) for forming a container.

The neck portion of the unfoamed preform was heated by using an infrared-ray heating device of a maximum output of 2500 W for 60 seconds so as to be crystallized. Thereafter, the preform was set in a pressure-resistant container maintained at 30° C. so as to imbibe the carbonic acid gas being held under a pressure of 15 MPa for 2 hours. Here, the degree of crystallization in cross section 30 μm deep from the surface of the neck portion was 39%, measured by using a laser-Raman spectrophotometer NRS-1000 manufactured by JASCO Co.

The degree of crystallization was close to a degree of crystallization of a neck portion of a commercially available heat-resistant bottle. The unfoamed preform was taken out from the pressure-resistant container and using oil bath, the unfoamed preform was entirely immersed in hot water at 90° C. for 10 seconds so as to be foamed. After foamed, the preform was cooled down to room temperature, and the cross section of the threaded portion was observed by using an X-ray CT scanning apparatus to find that the neck portion had not been foamed at all but the body portion had been foamed.

Example 9

The crystallization by heating and gas imbibition were executed in the same manner as in Example 8 but effecting the crystallization by heating for 52 seconds. The degree of crystallization in cross section 30 μm deep from the surface of the neck portion was 25%.

The unfoamed preform was foamed in the same manner as in Example 1. After foamed, the preform was cooled

TABLE 1

| Examples and Comp. Exs. | Container | Stretchin ratio (Longi. × Trans.) | Thickness T (mm) | Ave. long dia. L (μm) | Ave. aspect ratio L/t | Ave. surface roughness Ra (μm) | Luster |
|---|---|---|---|---|---|---|---|
| Ex. 1 | bottle | 2 × 2 | 0.68 | 29 | 8.7 | 0.5 | ○ |
| Ex. 2 | bottle | 3 × 3 | 0.32 | 42 | 11.6 | 0.3 | ◎ |
| Ex. 3 | pouch | 2 × 2 | 0.16 | 101 | 8.4 | 4.3 | ○ |
| Ex. 4 | pouch | 3 × 3 | 0.07 | 107 | 15.7 | 1.9 | ◎ |
| Ex. 5 | pouch | 4 × 4 | 0.05 | 102 | 19.8 | 1.4 | ◎ |
| Ex. 6 | pouch | 3 × 3 | 0.12 | 240 | 18.5 | 0.8 | ○ |
| Ex. 7 | cup | 4 × 1 | 0.26 | 103 | 8.2 | 2.3 | ○ |
| Comp. Ex. 1 | bottle | 1.5 × 1.5 | 1.20 | 22 | 5.1 | 0.5 | Δ |
| Comp. Ex. 2 | bottle | 3 × 3 | 0.31 | 45 | 12.0 | 6.2 | Δ |
| Comp. Ex. 3 | tray | undrawn | 0.58 | 24 | 1.3 | 3.3 | Δ |
| Comp. Ex. 4 | pouch | 1.5 × 1.5 | 0.34 | 72 | 4.3 | 4.0 | Δ |
| Comp. Ex. 5 | pouch | 3 × 3 | 0.10 | 204 | 17.6 | 6.8 | Δ |
| Comp. Ex. 6 | pouch | 3 × 3 | 0.11 | 719 | 15.6 | 2.3 | X |

*Three or more cell had been overlapped in the direction of thickness under all of the conditions.

down to room temperature, and the cross section of the threaded portion was observed by using the X-ray CT scanning apparatus to find that the neck portion had not been foamed at all but the body portion had been foamed.

Example 10

The crystallization by heating and gas imbibition were executed in the same manner as in Example 8 but effecting the crystallization by heating for 50 seconds. The degree of crystallization in cross section 30 μm deep from the surface of the neck portion was 18%.

The unfoamed preform was foamed in the same manner as in Example 8. After foamed, the preform was cooled down to room temperature, and the cross section of the threaded portion was observed by using the X-ray CT scanning apparatus to find that the neck portion had not been foamed at all but the body portion had been foamed.

Example 11

The crystallization by heating and gas imbibition were executed in the same manner as in Example 8 but effecting the crystallization by heating for 47 seconds. The degree of crystallization in cross section 30 μm deep from the surface of the neck portion was 13%.

The unfoamed preform was foamed in the same manner as in Example 1. After foamed, the preform was cooled down to room temperature, and the cross section of the threaded portion was observed by using the X-ray CT scanning apparatus to find that the neck portion had not been foamed at all but the body portion had been foamed.

Reference Example 1

The gas imbibition was executed without effecting the crystallization by heating. The degree of crystallization in cross section 30 μm deep from the surface of the neck portion was 9%.

The unfoamed preform was foamed in the same manner as in Example 8. After foamed, the preform was cooled down to room temperature, and the cross section of the threaded portion was observed by using the X-ray CT scanning apparatus to find that both the neck portion and the body portion had been foamed.

Reference Example 2

The crystallization by heating and gas imbibition were executed in the same manner as in Example 8 but effecting the crystallization by heating for 40 seconds. The degree of crystallization in cross section 30 μm deep from the surface of the neck portion was 10%.

The unfoamed preform was foamed in the same manner as in Example 8. After foamed, the preform was cooled down to room temperature, and the cross section of the threaded portion was observed by using the X-ray CT scanning apparatus to find that both the neck portion and the body portion had been foamed.

Reference Example 3

The crystallization by heating and gas imbibition were executed in the same manner as in Example 8 but effecting the crystallization by heating for 45 seconds. The degree of crystallization in cross section 30 μm deep from the surface of the neck portion was 12%.

The unfoamed preform was foamed in the same manner as in Example 1. After foamed, the preform was cooled down to room temperature, and the cross section of the threaded portion was observed by using the X-ray CT scanning apparatus to find that both the neck portion and the body portion had been foamed.

FIG. 11 shows the results and cross sectional photographs of Examples 8 to 11 and Reference Examples 1 to 3.

Example 12

A polyethylene terephthalate resin (PET) having an intrinsic viscosity of 0.84 was injection-formed into an unfoamed preform of the shape of a test tube having a body portion, a bottom portion and a neck portion (inner diameter of neck portion: 21.6 mm, thickness of body portion: 3 mm, content: 25.4 ml) for forming a container.

The unfoamed preform was set in a pressure-resistant container maintained at 30° C. so as to imbibe the carbonic acid gas being held under a pressure of 15 MPa for 2 hours. Thereafter, the unfoamed preform was taken out from the pressure-resistant container and was held at its neck portion by a metal mold provided with a cooling pipe. While cooling the neck portion, the body portion and the bottom portion were immersed in hot water at 90° C. using oil bath for 10 seconds so as to be foamed. After foamed, the preform was cooled down to room temperature and was cut in the axial direction. The neck portion through up to the body portion were observed in cross section to find that the neck portion had not been foamed at all but the body portion had been foamed.

For the purpose of comparison, further, the preform taken out from the pressure-resistant container was held by a metal mold without provided with the cooling pipe, and the body portion and the bottom portion thereof were immersed in the hot water using the oil bath so as to be foamed but without cooling the neck portion. After cooled down to room temperature, the preform was cut in the axial direction. The neck portion through up to the body portion were observed in cross section to find that the body portion had been foamed and, at the same time, the neck portion had been foamed to a slight degree.

The invention claimed is:

1. A process for producing a foamed preform for forming a container by preparing an unfoamed preform for forming a container of a single-layer structure using a thermoplastic resin imbibing an inert gas, and forming the unfoamed preform by selectively heating part of said unfoamed preform in a manner that a portion corresponding to the mouth of the container and the vicinity thereof are not foamed.

2. The process for producing a foamed preform according to claim 1, wherein said thermoplastic resin is injection-formed or extrusion-formed into a preform imbibing no inert gas, and the preform imbibing no inert gas is held in an atmosphere of said inert gas of a high pressure to form said unfoamed preform.

3. The process for producing a foamed preform according to claim 2, wherein the preform imbibing no inert gas is of a shape including a neck portion that has a thread formed on an outer surface thereof, a body portion continuous to the neck portion, and a bottom portion, the preform imbibing no inert gas is heated and cooled in a manner that the neck portion is selectively crystallized and, thereafter, the preform imbibing no inert gas is held in the atmosphere of the inert gas of a high pressure.

4. The process for producing a foamed preform according to claim 1, wherein, by using a forming machine equipped with a melt-kneading unit, said thermoplastic resin and said inert gas are fed into said melt-kneading unit, and a melt of the thermoplastic resin imbibing said inert gas is injected or extruded from said forming machine to thereby prepare said unfoamed preform imbibing the inert gas.

5. The process for producing a foamed preform according to claim 4, wherein the melt of said thermoplastic resin imbibing the inert gas is injection-filled in a mold from said forming machine to thereby prepare said unfoamed preform imbibing the inert gas.

6. The process for producing a foamed preform according to claim 1, wherein the unfoamed preform imbibing no inert gas is held at atmospheric pressure as part of the inert gas is released to form a skin layer which contains no inert gas on a surface of the unfoamed preform, and thereafter, the unfoamed preform is heated and is foamed.

7. The process for producing a foamed preform according to claim 1, wherein the unfoamed preform is heated and foamed in a manner that an average cell diameter of foamed cells formed by heating is in a range of 5 to 50 μm and that the cell density is $10^6$ to $10^9$ cells/cm$^3$.

8. The process for producing a foamed preform according to claim 1, wherein the unfoamed preform is heated in a manner that no foamed cell is formed in a central portion of the unfoamed preform in the direction of thickness thereof to thereby form an unfoamed core layer therein.

9. The process for producing a foamed preform according to claim 1, wherein after the unfoamed preform has been foamed, the obtained foamed preform is cooled.

10. A process for producing a foamed plastic container by stretch-forming the foamed preform of claim 1.

11. The process according to claim 10, wherein the foamed preform of claim 1 is cooled and is, thereafter, heated again at a temperature at which it can be stretched so as to be stretch-formed.

12. The process for producing a foamed preform according to claim 1, wherein the thermoplastic resin is a polyester resin.

* * * * *